Sept. 19, 1967    A. SERAGNOLI    3,342,350
MECHANISM FOR TRANSFERRING ARTICLES FROM ONE MACHINE TO
ANOTHER, WITH A STORE AUTOMATICALLY ACTING AS
BAG, PARTICULARLY ADAPTED FOR AUTOMATIC
WRAPPING MACHINE AND THE LIKE
Filed March 20, 1964    6 Sheets-Sheet 5

INVENTOR.
Ariosto Seragnoli,
BY
Watson, Cole, Grindle & Watson
ATTORNEYS

United States Patent Office 3,342,350
Patented Sept. 19, 1967

3,342,350
MECHANISM FOR TRANSFERRING ARTICLES FROM ONE MACHINE TO ANOTHER, WITH A STORE AUTOMATICALLY ACTING AS BAG, PARTICULARLY ADAPTED FOR AUTOMATIC WRAPPING MACHINE AND THE LIKE
Ariosto Seragnoli, Via Pomponia 10, Bologna, Italy
Filed Mar. 20, 1964, Ser. No. 353,380
Claims priority, application Italy, Apr. 9, 1963, 7,196/63
10 Claims. (Cl. 214—16)

In the field of automatic wrapping machines there is a trend towards the use of machines connecting in series, the machines performing sequential operations on articles. In this way, the articles coming from machines, which will be called delivery machines and which must undergo subsequent operations, are conveyed to machines, which will be called reception machines.

This is performed by transfer lines or mechanisms which, in order to ensure the continuity and regularity of working of the machines, for which they are intended, have to compensate for the phase-shifts between the production of the delivery machines and the consumption of the reception machines.

To this end, there have been devised compensating storing devices which automatically accumulate articles by withdrawing them from the transfer lines and return them to said line according to requirement. An example of prior art devices of this type is U.S. Patent to G. Ekström et al., No. 1,609,802 December 7, 1906.

However, all of the known systems have the drawback of a limited accumulating capability, so that with the up-to-date machines having a high speed of production the stores acting as bag are insufficient to compensate for the phase shifts between delivery and reception of the articles, thus preventing satisfactory automatic production.

Thus, one object of the present invention is to provide a transfer mechanism with a storage feature having a great accumulating capability for automatically accumulating articles and automatically returning them to the transfer line, which allows fully automatic operation of said conveyor lines even in up-to-date plants having a high production capability.

In order to accomplish this, the invention contemplates the cooperation in a transfer line of an intermittently moving conveyor with a series of accumulating devices constituting a store of high capacity, within which there are automatically heaped up the articles when the reception machine is not running and from which the articles are again withdrawn both when the delivery machine does not run and when the output of the delivery machine must be supplemented by a supply of articles. To this end, there are provided automatic control and driving devices.

The conveying capacity of the transfer mechanism and reception mechanism of the reception machine may be equal to the output capacity of the delivery machine. However, to achieve this, it will be necessary for all of the three machines to be operated in sychronism, which involves complications in the plant and restrains the working of the machines, so as to render more complex the plant, especially if it is desired to stop the delivery machine and the reception machine independently of each other.

In the present invention there is also contemplated that both the delivery machine and the reception machine as well as the transfer mechanism should each be operated by a motor of their own, whereby the conditions of installation are simplified as much as possible. To avoid interruptions, in this case it is contemplated that the capacity of the reception machine should be greater than the conveying capacity of the transfer mechanism and that the conveying capacity should be greater than the output capacity of the delivery machine.

The present invention is illustrated by way of example and without limitation thereto, in the specification that follows and in the accompanying drawings forming an integral part thereof. In the said drawings.

In the various figures, like reference numerals denote like parts and it will be understood that the immovable and movable parts disclosed hereinafter are secured and guided in any suitable manner in a stationary base of the machine, the base being shown in the figures.

Figures 1, 2:
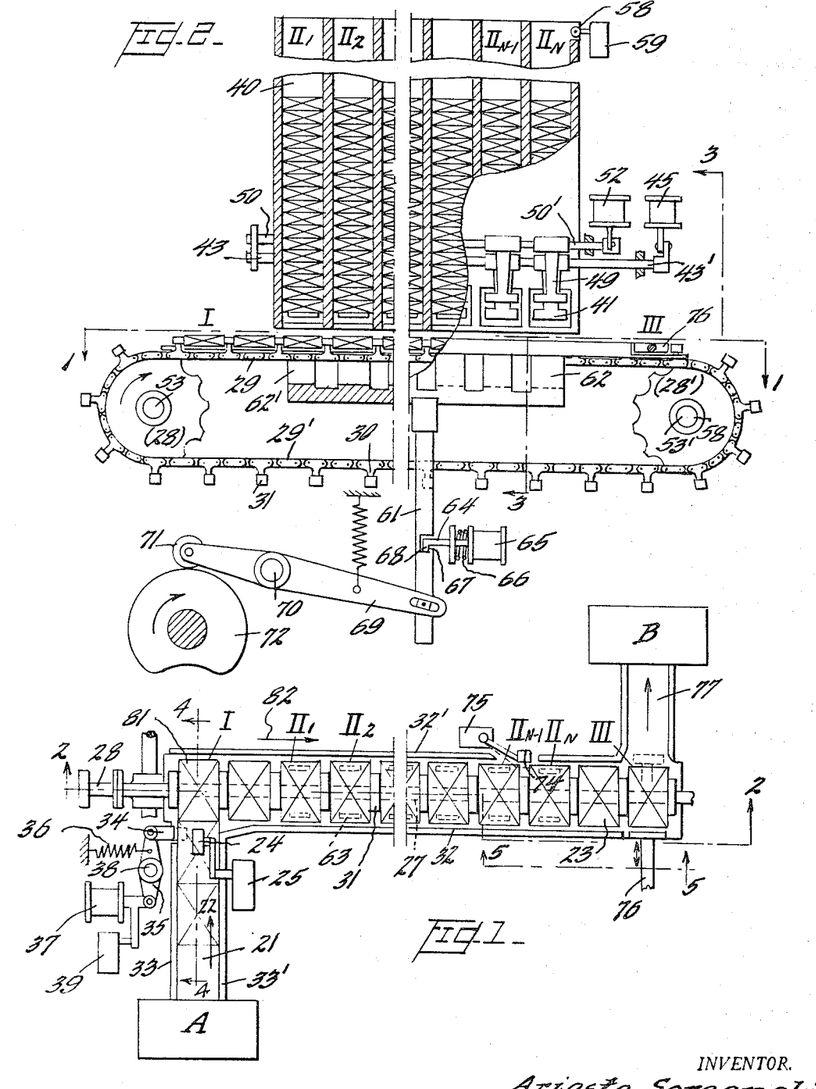
FIG. 1 is a diagrammatical fragmentary view from above of the mechanism looking in the direction line 1—1 of FIG. 2.
FIG. 2 is a fragmentary vertical section of the mechanism taken along the line 2—2 of FIG. 1.

Referring to FIGS. 1 and 2, a delivery machine, indicated by the reference indicia A, delivers articles through the transfer line of the invention, which articles are conveyed to a reception machine denoted by the reference indicia B.

The invention may be disclosed by following the path of travel of representative articles, which are indicated by 23 in the drawings. Reference numeral 21 denotes an endless conveying belt wound on a roller 80 carried by shaft 56 rotating on stationary supports not shown and on a roller, not shown, which belt moves in the direction of the arrow 22 and conveys the articles 23 from the machine A to the transfer mechanism.

On the sides of belt 21 there are arranged stationary guides 33, 33', which form a channel for conveying the articles 23.

Figure 4:
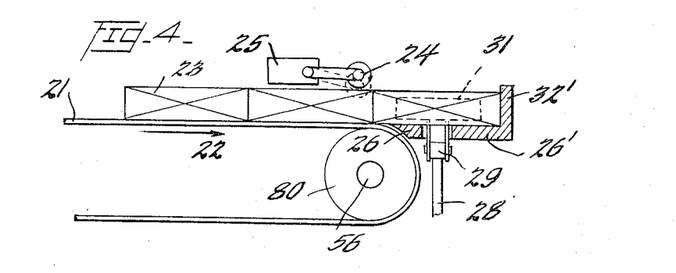
FIG. 4 is a diagrammatical fragmentary vertical section of the mechanism taken along the line 4—4 of FIG. 1.
Figure 6:
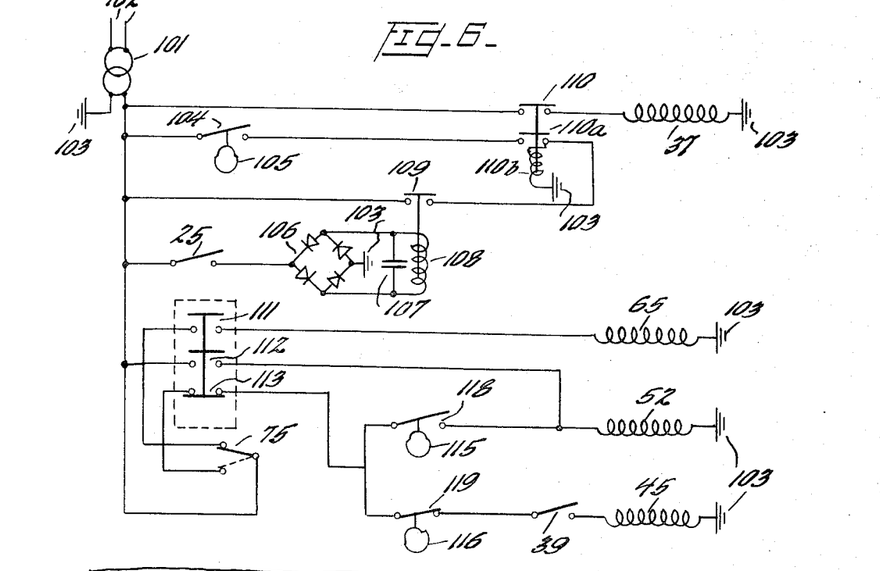
FIG. 6 is an electrical schematic diagram showing the principles of a follow-up mechanism for the various parts.

A sensitive feeling device 24 bears upon the articles 23 advancing on belt 21 and may assume two positions, one below as shown in dotted lines in FIG. 4, if no articles are present and another above as shown in full lines in FIG. 4, if articles are present thereunder. The feeling device 24 operates a switch 25 which, when the feeling device is in the upper position, is open, as shown in FIG. 6. It is closed when the feeling device 24 is in the lower position.

At the end of belt 21 (FIGURE 4), there are provided two parallel stationary laths 26, 26' forming a support for the articles 23 as they travel on a course which is orthogonal to that of the belt 21. Between the two laths there remains a slot 27.

On the sides of the laths 26, 26' there are provided guides 32, 32' which cooperate with said laths to form a rectangular channel for the advancement of the articles.

At the end of belt 21 and just a short distance ahead of the guide 32 is the end 34 of a lever 35 which is pivotally supported in a stationary fulcrum 38. Under the influence of both a return spring 36 exerting a pull between the base and said lever and on action of the electromagnet 37, the lever can assume either of two positions. In a position of rest, that is to say in the position as shown in FIG. 1, the end 34 of the lever is maintained outside the path of the articles 23 on belt 21 by the return spring 36 when the electromagnet 37 is not excited. When the electromagnet 37 is excited, the end 34 of lever 35 is pushed into the path of the articles 23 on the belt as shown by hatched lines in FIG. 1, so as to stop the articles. The anchor of the electromagnet 37 co-operates with another electric switch 39 which is open when the electromagnet is de-energized and which is closed when the electromagnet is excited.

Two sprocket wheels 28, 28' supported by shaft 53, 53' capable of turning within stationary supports, not shown, carry endless chain 29, 29' to whose links there are fastened the projecting arms 30. The chain moves with the upper branch 29 a short distance beneath the laths 26, 26' and in coincidence with the slot 27.

The arms 30 on the upper path of the belt pass into the slot 27 and project upwards. To that part of the arms 30 there are fastened crosspieces 31 which in the upper run of the chain, see FIG. 2, move above the supports 26, 26' and close thereto, see particularly FIG. 3.

The crosspieces 31 and arms 30 are spaced a predetermined distance apart whereby an article 23 may be received between adjacent crosspieces.

The chain 29 is moved intermittently by a mechanism of the usual type (not shown), so that at each intermittence the crosspieces 31 advance by a distance equal to the distance between adjacent crosspieces. In this way the chain constitutes a conveyor for the articles 23. Thus, the spaces 81 between adjacent crosspieces are in succession being stopped in subsequent positions, which will be called stations.

The chain 29 moves in the direction of the arrow 82. During its movement the spaces 81 in succession stop first of all in a station I which is situated in front of the end of belt 21 and aligned with the channel formed by the guides 33, 33'. Subsequently, the spaces 81 will stop in other stations, amongst which there are those shown in the drawing as $II_1, II_2, \ldots II_{n-1}, II_n$. In these stations above the chain and aligned with the spaces when they stop in said stations there are provided vertical channels 40 formed by vertical walls, one upon each of said stations.

Said channels 40 form a plurality of vertical storage magazines, into which and from which the articles 23 may be introduced and withdrawn at the bottom thereof.

The lower part of said channels are open and provided with coupling teeth 41, 41'. Said teeth are carried by toggle levers 42, 42' integral with the sleeves 83 mounted loose on shafts 43, 43', which latter are rotatable in stationary supports represented diagrammatically.

Figure 3:
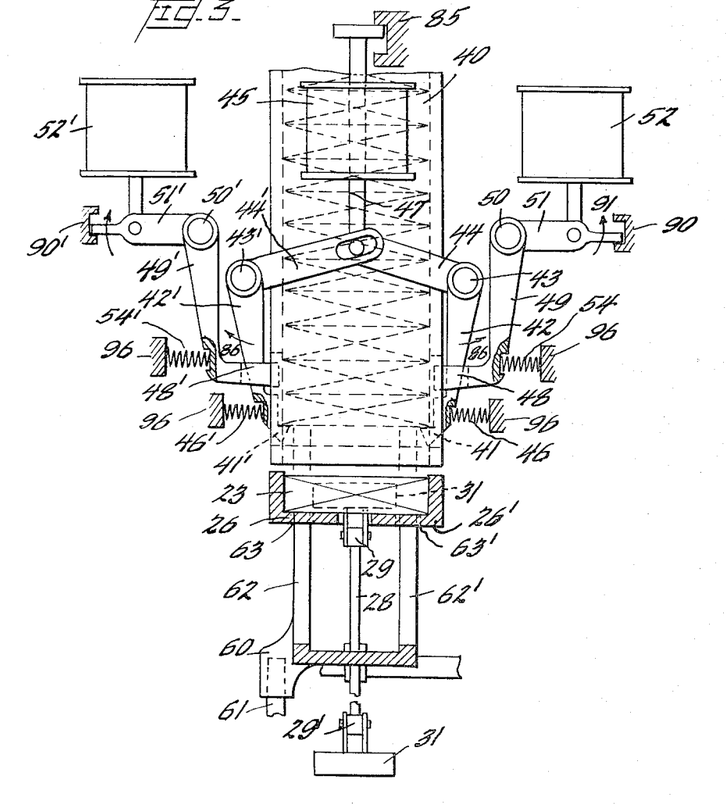
FIG. 3 is a diagrammatical fragmentary vertical section of the mechanism taken along the line 3—3 of FIG. 2.

Each of said sleeves is provided with a peripheral eyelet 79 and in coincidence with each of them on the shaft there is secured a plug 78 which prevents the corresponding sleeve from axially sliding on shaft 43 and permits said sleeve to perform a slight rotary motion on the shaft in the direction of the opening of the teeth 41, 41'. Reference numerals 46, 46' denote springs acting in opposition between stationary points 96 at the base and the levers, 42, 42', whereby the teeth 41, 41' are caused to protrude into the channels 40, as shown in FIG. 3. The movement in this direction is restricted by the contact of plug 78 with the end of eyelet 79, as shown in FIGURES 5 and 8.

The shafts 43, 43' through the lever 44, 44' are operated by an electromagnet 45 which, upon being excited, pulls downward its own anchor as far as to hit against the stop 85, thus causing the levers 42, 42' to rotate in the direction of the arrows 86 and, consequently, the teeth 41, 41' to abandon the space occupied by the channel 40, see FIGURE 3.

Two sets of teeth are provided for each of the channels 40. On opposite sides of the channels, above the teeth 41, 41' there are provided pressing members 48 carried by levers 49, 49' integral with the sleeves 87 mounted loose on the shafts 50, 50' capable of rotating, in their turn, in stationary supports as diagrammatically shown in FIG. 2. The shafts 50, 50' carry the arms 51, 51' which may be moved upwards under the action of electromagnets 52, 52' or they may rest with their ends against the stops 90.

Figure 5:
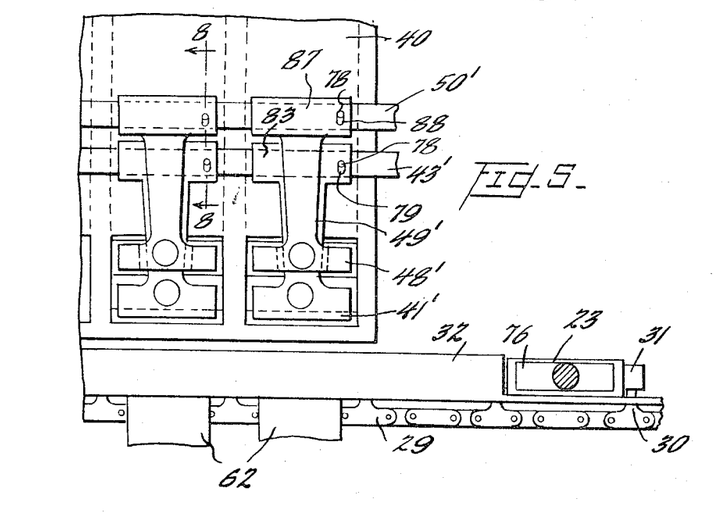
FIG. 5 is a fragmentary view of the mechanism taken along the line 5—5 of FIG. 1.
Figure 8:
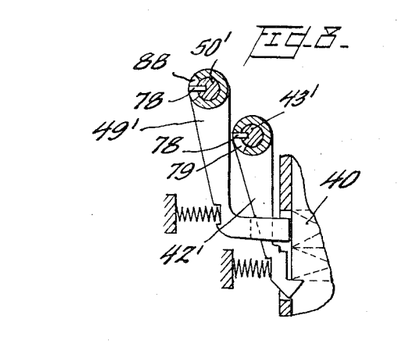
FIG. 8 is a fragmentary section looking in the direction of line 8—8 of FIG. 5.

Each sleeve 87 is provided with a peripheral eyelet 88 and in correspondence thereto on shaft 50 there is secured a plug 89 which is movable with said eyelet, see FIGURES 5 and 8.

The levers 49, 49' are operated by the springs 54, 54' in opposition to stationary points of the base which, when the electromagnets are not excited, cause the pressing members to flexibly compress the articles 23 within the channels 40 owing to the play of plugs 78 within the eyelet 88, as shown in FIGURES 3 and 8.

If instead the electromagnets 52, 52' are excited, they pull upwards their own anchors and cause to rotate in the direction of arrows 91 the shafts 50, 50' which through the contact of plugs 78 with the end of the eyelets 88 pull outwards the pressing members by overcoming the thrust of springs 54, 54'.

The pressing heads 48 pass into special slots provided on the flanks of the channels and above the bearing plane of the teeth 41, 41' they are situated at such a level that, when they are in the closing position, they exert from below a thrust upon the penultimate article so as to keep it fast by engaging it on the sides, as shown in FIGURE 3. For each channel 40 there is provided a pair of pressing members 48, 48'.

The channels 40 are open towards the top. In a preferred form of embodiment of the invention, at the top of a channel 40, preferably that in the station 11.n there is provided a sensitive feeling device 58' which slightly protrudes into the channel itself and is connected with an electric switch 59. The latter is closed if in the channel 40 there are no articles reaching the height of the feeling device 58' and it is opened if said channel is filled with articles up to the level of said feeling device 58' by thrusting it outward.

Said switch 59 is inserted into the electric control device for the delivery machine so that, when the switch 59 is opened, the delivery machine is stopped.

Beneath the laths 26, 26' at the channels 40 there is situated an elevator 60 carried by the arm 61.

Said arm 61 is located to one side out of the trajectory of the chain 29 and the cross members 31, so that it can freely move up and down without interfering therewith. The elevator 60 extends in the space existing between the upper branch 29 and the lower branch 29' of the chain which carries the cross members 31, so that it can vertically move in said space without interfering with the branches 29, 29' of said chain.

The elevator is provided with as many couples of fingers 62, 62' as there are channels 40, each couple being aligned with one of the channels 40 which enter corresponding holes provided in the laths 26, 26'.

The elevator 60 may move vertically passing from a lower position, that is the position shown in FIGURE 3, in which the upper end of the fingers 62, 62', is at the same level as that of the upper edge of the laths 26, 26', to an upper position, as shown by a dotted line in the same FIGURE 3, in which the upper edge of fingers 62, 62', is situated somewhat above the lower edge of the teeth 41, 41'.

The movement of rod 61 which controls the elevator 60, according to known systems, may itself be controlled by the action of a latch 64 operated by an electromagnet 65 in opposition to spring 66. The rod 61 is provided with a notch 67 within which when the electromagnet 65 is no longer excited, the latch 64 engages every time the rod 61 is in the lowermost position.

The end of the latch 64 is provided with a tooth 68 cooperating with a corresponding tooth of the notch 67 so that, when the arm 61 is pushed upwards, the two surfaces are hooked up between each other and the latch 64 cannot be withdrawn not even if the electromagnet 65 is excited.

The arm 61 according to known systems is operated through a lever 69 pivoted in the stationary point 70 and which through a small roller 71 is acted upon by a cam 72. The lever 69 is again moved upward by a spring 73 so that, when the profile of cam 72 clears the upward slope of lever 69, the lever itself pushes upward the rod 61 and lifts it, with the exception of the case in which the latch 64 is engaged with the notch 67.

Figure 9:
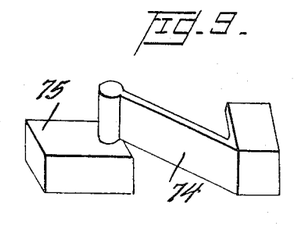
FIG. 9 is a fragmentary perspective view of a detail of the mechanism.

On the side of latch 32' at the station 11.n there is provided an opening which is entered by a swinging arm 74 connected with a commutator 75 and which by a spring, not shown, is pushed towards the interior of the channel situated between the edges 32, see FIGURES 1 and 9 and 32'. Said arm may swing between two end positions, one of which is indicated in FIGURE 1 and which the arm may assume if in the station 11.n there are articles 23: in this case the commutator 75 is in the position as shown with a continuous line in FIG. 1.

In the second end position, which the swinging arm 74 takes up under the action of the return spring, when in the station 11.n there are no articles, the commutator 75 is in the position as shown by a hatched line in FIG. 1.

The pawls 62, 62' of the elevator 61 are sufficiently spaced apart between each other so as to permit the passage between them, when they are in the upper position, of the cross members 31 which are shorter, thus avoiding during the operation any interference of the motion of the elevator with that of the cross members 31.

The pawls 62, 62' act upon the ends of the articles 23 outside the region swept by the cross members 31.

Beyond the region of the channels 40 the spaces 81 in succession are stopping in the station 111, in front of which, on one side of the space there is provided a pushing member with reciprocating motion 76 and on the other side a channel 77 formed from a bottom and from stationary edges.

The reciprocating pushing member 76 moves between two end positions respectively shown by a continuous stroke and a hatched stroke in FIG. 1. The pushing device 76 operates rhythmically under the action of a reciprocating mechanism, not shown, which causes it to move from the continuous stroke position into the hatched stroke position every time a space is immovable in front of it.

The lower part of the channels 40 beneath the teeth 41, 41' (FIG. 3) extends beneath the inclined planes of said teeth 41, 41' by an amount sufficient for two articles 23 to occupy, one of which rests on the laths 26, 26' and the other, in turn, rests on the underlying article.

In the electric diagram showing the principles (FIG. 6), reference numeral 101 denotes an electric transformer fed by the net 102. At the outlet of the transformer the line closes on a mass-branch 103, whereas the current line leads to two electric circuits.

Reference numeral 104 denotes a switch rhythmically opened by a cam 105 which performs a revolution in the same period in which the chain 29 accomplishes a cycle of advancement and a dwell.

106 is a current rectifier, 107 is a condenser, 108 is an attraction electromagnet for a relay which closes the contact 109.

110b is an attraction electromagnet for a relay which closes the switches 110a and 110; 37 is an electromagnet which controls the pawl 34 (FIG. 1).

The rectifier assembly 106, the condenser 107, the electromagnet 108 and the contact 109 form an instantaneously closing relay and a delayed opening, that is to say an opening which opens the switch 109 with a predetermined delay produced by the electric ratios of the circuit, from the instant at which the switch 25 has been opened.

The circuit as shown in the lower part of FIG. 6 comprises a pile of auxiliary contacts 111, 112 and 113 connected with the switch of the reception machine B. The contacts are represented in the position they assume when said reception machine is running. When the reception machine stops, the closed contacts open and vice versa.

115 and 116 denote two cams which synchronously rotate with the cam 105 and which operate respectively the switches 118 and 119, interrupting the respective contact once at every revolution.

45, 52 and 65 respectively denote the electromagnets for the hooking teeth, as well as for the pressing and control devices of the rod 61, as shown in FIGURES 2 and 3.

Figure 7:
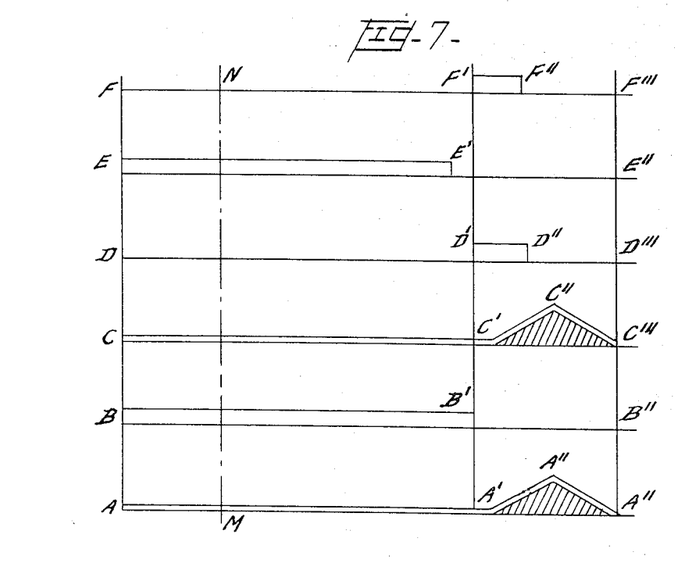
FIG. 7 is a diagram of the phases of movement of the essential elements of the mechanism.

In FIGURE 7 there is indicated in abscissas the time A–A''' equal to the duration of a period, at the end of which all of the parts are again in the positions they had assumed at the beginning of said period. On the various lines there are indicated the opening and closing phases of the various electric contacts as well as the phases of movement of the various members, in function of the time.

In line A–A''' there is shown, in ordinates the diagram of the vertical movements of the elevator 61 when its movement is permitted by the bolt 64. A–A''' is the ascent and A''—A'' is the descent. Outside the time A'–A''' the elevator is always immovable below.

Line B–B'' indicates the phases of movement of the chain 29 (in the time B–B') and of dwell (in the remaining time B'–B'').

Line C–C'' indicates in ordinates the movements of the pushing member 76; C'–C'' is the advancement, C''–C''' is the return back, C–C' is the dwell back.

Line D–D'' indicates the phases of the switch 104 open at the times D–D' and D''–D''' and closed at the time D'–D''.

Line E–E'' indicates the phases of the switch 118 closed at the time E–E' and open at the time E'–E''.

Line F–F''' indicates the phases of the switch 119 open at the times F–F' and F''–F''' and closed at the time F'–F''.

The vertical line formed from a stroke and point NM indicates the instant in which the sensitive lever 74 is released within the empty space 81 when it is moved forward in the station 11.n by the advancement of chain 29.

The operation of the mechanism takes place as follows:

The articles 23 coming from the machine A and moved forward by the belt 21 are pushed into the spaces formed by the traverses 31 every time that one of said spaces stops in the station 1. When the chain 29 advances, the articles 23 pushed by belt 21 do not move, insofar as they are opposed by the preceding article located in the aforesaid space 81, until the chain has advanced by a step, whereupon they are pushed forward so as to reach the subsequent space 81.

As long as on the end portion of the belt 21 there are articles 23, they keep lifted the sensitive lever 24, the switch 25 is open and there are open also the contacts 109, 110 and 110a. The electromagnet 37 is deenergized, the tooth 34 is in the position of rest and does not hinder the advancement of the articles 23 on the belt 21 and the switch 39 is open, so that the teeth 41, 41' project into the channels 40 and prevent the descent of articles.

Let us first consider the case in which both of the machines A and B are moving and consequently the articles 23 pass from one to the other through the mechanism of the storing devices. As already stated above, said articles are taken into the aforesaid spaces 81 and during the movement of the conveyor chain 29 they are in succession dwelling in all of the stations $11_1$, $11_2$ ... $11.n$ as far as to reach the station 111.

If a space is immovable in station 111, the pushing member 76 advances and pushes the article 23 out of the space 81 in the channel 77, towards the machine B: thereupon the pushing member 76 moves back so as to permit the chain 29 to freely move.

As already stated in the foregoing the conveying capacity of chain 29 is greater than or equal to the production of machine A. However, owing to the waste of the latter also in the second case it always occurs that the number of articles reaching the conveyor is less than that the conveyor is capable of conveying.

It ensues that the articles existing along the belt 21 are pushed one behind the other into the spaces 81 in station I until at a certain instant, when there are no more articles on belt 21, the arm 24 moves down and closes the switch 25. The electromagnet 108 is immediately excited by closing contact 109 and through the latter there is at once excited the relay 110b so as to close contact 110a which maintains self excited the electromagnet 108 and 110, through which the current proceeds to excite the electromagnet 37. The latter causes its own armature to move and pushes the bolt 34 into the path of the articles 23 along the belt 21, so as to prevent the advancement of other articles. At the same time there is closed switch 39 which permits the teeth 41 to open.

When another article reaches the underside of the sensitive arm 24, it lifts the same and opens again contact 25. However, contact 109 is kept closed during the whole time corresponding to the delay of the electric circuit 106–107–108. Said delay is established in such a way as to permit at least the passage of the space 81 which in station I is situated in station III. After this period of time the contact 109 opens and the electromagnet 108 in turn is positioned so as to be de-energized and open the contacts 110, 110a when cam 105 opens the switch 104.

In this way contact 110 may open only if chain 29 is immovable and in front of belt 21 there is situated a space 81, that is to say in phase with the movement of the chain, see FIG. 7.

Upon the contact 110 being opened, the electromagnet 37 is de-energized, the bolt 34 is shifted to the outside to cause the spring 36 to return and the article 23, which rested thereon, is moved forward by the chain 21 so as to enter the space 81 immovable in station 1. At the same time the switch 39 is again opened and the teeth 41 can no longer be opened.

The same manner of operation takes place upon the machine A starting and again running after a stop. Bolt 34 permits starting to feed the chain-conveyor 29 only if against the bolt there has stopped a number of articles which is higher than the number of stores 40, and this in dependence of the delay of operation of the relay 108.

Every time the bolt 34 enters the path of the articles 23 so as to prevent them from advancing, the flow of articles into the spaces of the chain 29 is discontinued, whereby all of the spaces of said chain are emptied up to station $11.n$.

At this time the oscillating arm 74, which is no longer maintained stationary by the opposition of the articles 23, shifts towards the space 81 into the position shown hatched in FIG. 1 and causes to shift the contact of commutator 75 from the position as shown by a continuous stroke in FIG. 6 to that shown by a hatched line.

As the machine B is running, the contacts of the remote control switch 111, 112 and 113 are in the position shown in FIGURE 6.

The current through the contact 113 reaches the switches 118 and 119 operated by the cams 115 and 116, respectively.

Thus, there is at first produced the excitation of the electromagnet 52, see diagram FIG. 7 and the opening of the pressing members 48, 48', see FIGURES 2 and 3.

The articles 23 contained in the stores 40 are lowered until the lowermost articles will rest on the teeth 41, 41'. Thereupon, see FIG. 7, the switch 118 opens again, the magnet 52 is deenergized and the pressing members close again, keeping back in every channel the penultimate article and all of the overlying articles. Subsequently in the period of time D'–D'', while the empty spaces 81 are stationary one beneath each station $11_1$, $11_2$ ... $11_n$, the switch 119 is closed, the electromagnet 45 is excited, receiving current through the switch 39 which is closed insofar as lever 35 is in the active position, the teeth 41, 41' open and cause to drop in every space 81 the article 23 placed thereon. The article 23 which drops into station $11.n$ acts upon the upper inclined plane of lever 74 (FIG. 9) and takes it outside, removing current from the electromagnet 45, so that the teeth 41, 41' close again.

Thereupon starts again the normal conveyance to the machine B of the articles contained in the spaces 81 until the new arrival of an empty space in the station $11.n$ causes the aforesaid cycle to be repeated, and so on.

It may happen that, when the sensitive lever 74 shifts from the position shown by a continuous line to a position shown by a hatched line, not all of the spaces situated beneath the channels 40 are empty. In this case the articles dropping down from the teeth onto the underlying spaces, which formerly contained articles, will rest on said articles in the free space beneath the teeth.

When all of the filled spaces are moved through and there appears again an empty space, the articles drop down to fill it up, so as to restore the former conditions of operation.

This method is rhythmically repeated every time that there are no articles on the belt 21, so as to ensure the normal operation of the machine and to complete the production of articles of the machine A by withdrawing from time to time articles from the channels 40.

Let us now consider the case in which the machine B does not move and the machine A is moving. The auxiliary contacts 111, 112 and 113 of the operating switch of the machine B are reversed insofar as the whole battery of contacts shifts from above downwards; contact 113, which was closed, opens and contacts 111 and 112, which were open, close. The pressing members open insofar as the electromagnet 52 receives current through the contact 112. If now in the station $11.n$ there is an article, the current through the commutator 75, which is in the position shown by a continuous stroke, flows to contact 111 and from there to the electromagnet 65 which withdraws the tooth 68 and permits the elevator to start. Thereupon the elevator 61 moves up and exerts a thrust on the articles placed thereon which, by moving through the opening of the teeth 41, 41', pass beyond them and stop thereon.

Thereupon the elevator moves down and takes up the original position.

If an article should fail to reach station 11.n, the commutator 75 takes up the position shown by a dotted line in FIG. 6 and prevents further operation of the elevator until a space containing an article again reaches station 11.n; then the operation starts again and so on.

In this way there is achieved an entirely automatic working of the storage mechanism which, on one hand, automatically supplies the transfer line with the difference between the articles furnished by the machine A and those absorbed by the conveyor line and, on the other hand, it causes to accumulate in said channels all of the articles furnished by the machine A if machine B does not move.

If the machine B should be stopped for a longer period of time, then the articles 23 keep on moving up in the channels 40, until the uppermost of them in the station 11.n proceeds to push the sensitive lever 58' and to operate the switch 59, which causes the machine A to stop, the electric circuit being obvious and, consequently, not shown. The machine A may then start only if the machine B has again started and has again withdrawn from the channels 40 at least one layer of articles 23, in accordance with the method of operation disclosed above.

Figure 10:
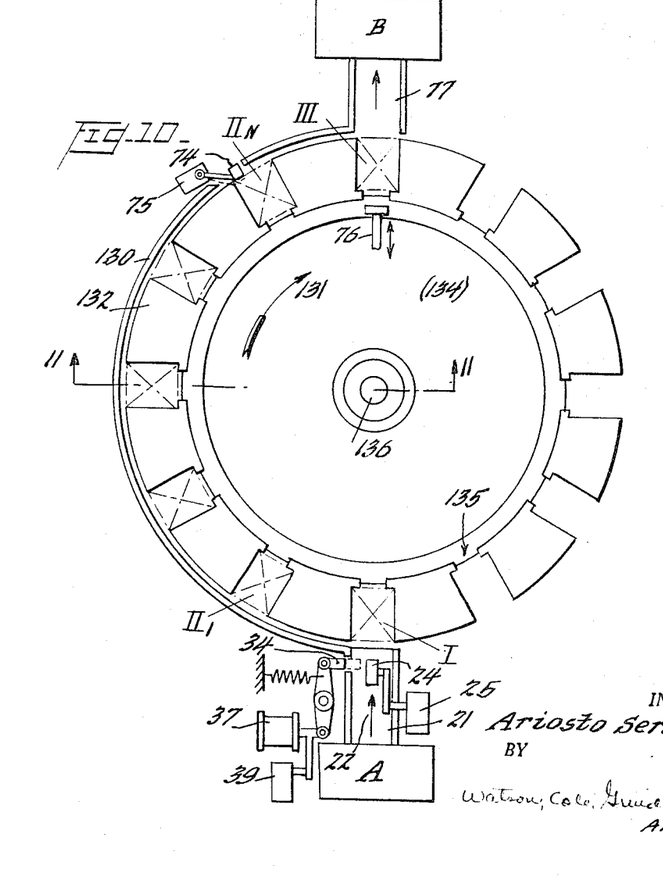
FIG. 10 is a diagrammatical fragmentary view, as seen from above, of an alternative embodiment of the invention.
Figure 11:
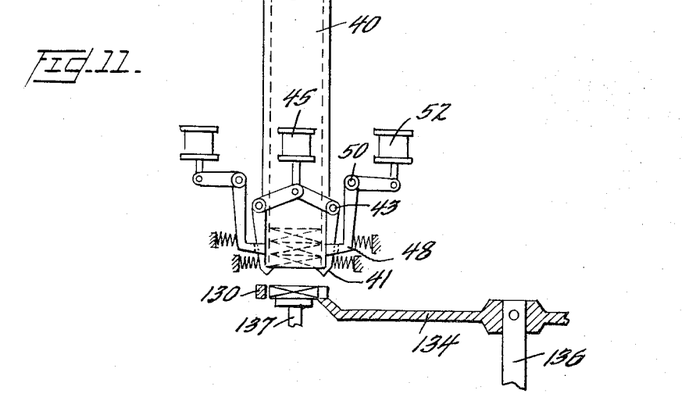
FIG. 11 is a diagrammatical fragmentary section looking in the direction of line 11—11 of FIG. 10.

In FIGS. 10 and 11 there is represented an alternative form of embodiment of the invention. The conveyor is formed from a disc 134 carried by the shaft 136 having preferably a vertical axis rotatable in supports, not shown, of the base. The disc is caused to intermittenly rotate in in the direction of the arrow 131 by means of an operating mechanism of usual type, not shown.

On the peripheral rim 132 of the disc there are provided notches 133, each of which is of such a shape as to be able to receive an article 23. At every intermittence the disc rotates by the angular pitch equal to that between adjacent notches. The notches are in succession dwelling in the stations 1, 11$_1$ . . . 11.n, 111.

In the stations under the space swept by the notches there is provided a stationary support, not shown, which in the stations II$_1$ . . . II.n has holes for the passage of elevators 137.

Between the stations I and III on the periphery of the disc there is provided a curved border 130 which prevents the articles 23 from leaving the notches and which at the station II.n has a hole in which there acts a flexible withdrawal performing feeling lever 74 connected to an electric switch 75.

In the station I with the immovable spaces 133 there is aligned a belt 21 for the arrival of the articles from the delivery machine A and adjusted with respect to station I as well as provided with the same devices as already described in connection with the first form of embodiment and bearing the same reference numerals.

The inner walls of the notches 133 are provided with an opening 135 of such a size as is sufficient for the passage of a pushing member 76. In station III from parts opposite the immovable space 133 there are aligned an outlet channel 77 which extends to the receiving machine B and the already mentioned pushing member 76 having a reciprocating motion and arranged in such a way as to enter the notch 133 and to push the article 23 into the channel 77.

Above each of the stations 11$_1$ . . . 11.n there is arranged a channel 40. Each channel 40 is provided with coupling teeth 41 and pressing members 48, with the respective operating electromagnets 45, 52. Under the stores there act the aforesaid elevators 137 carried by an arm 61.

All of the devices 34, 37, 39, 24, 25, 21, 74, 75, 76, 61, 40, 41, 48 are completed with accessories in the same manner as already disclosed in connection therewith in the description of the first form of embodiment of the invention and they work in the same manner insofar as they are correlated with the same phases of movement.

The phases of movement of the disc 134 correspond with those of the chain 29.

Figures 12, 14:
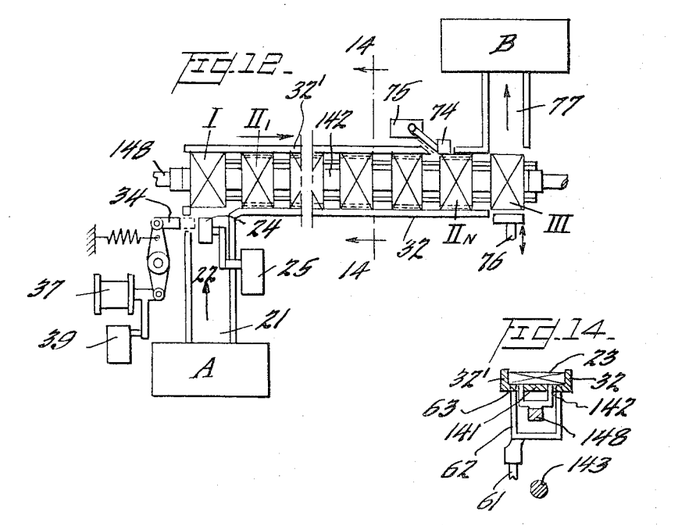
FIG. 12 is a diagrammatical fragmentary view, as seen from above, of another alternative embodiment of the invention.
FIG. 14 is a diagrammatical fragmentary section taken along the line 14—14 of FIG. 12.
Figure 13:
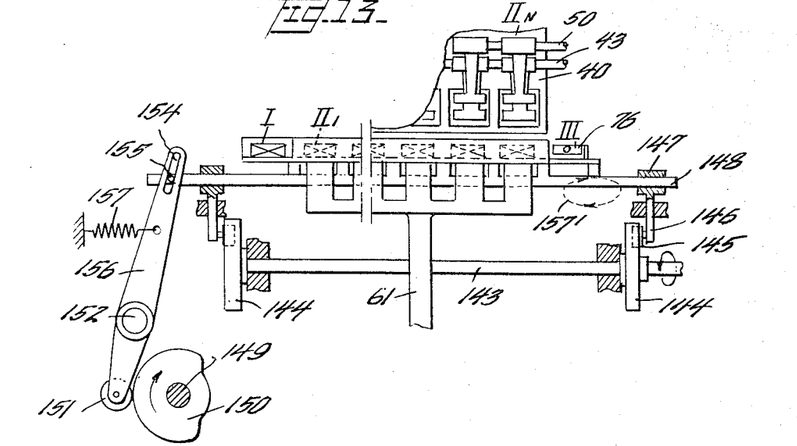
FIG. 13 is a diagrammatical side view of the mechanism of FIG. 12.

In the FIGURES 12, 13 and 14 there is represented another preferred form of embodiment of the invention: 141 is a stationary plane support cooperating with two stationary borders 32, 32' intended to form a channel for a thrust conveyor of the articles 23. In the support 141 there are provided longitudinal slots for the passage of the teeth 142 of a comb capable of performing a mixed vertical and horizontal motion. 143 is a shaft rotatably mounted in supports provided stationary at the base and it performs a revolution at every cycle of the transfer mechanism. On the shaft 143 there are secured two cams 144 provided with grooves in which there are engaging small rollers 145 carried by rods 146 which are vertically guided in supports mounted stationary on the base. The rods 146 carry supports 147 in which there is horizontally slidably mounted the rod 148 to which there are secured the combs 142.

The cam 150 carried by shaft 149 which, too, performs a revolution at every working cycle of the transfer mechanism, through the roller 151 acts upon the lever 156 pivoted at 152 on the base and subject to the return action of the spring 157. The lever 156 is provided with a slot 154 in which there is engaged a knob 155 carried by the rod 148.

The free space between two consecutive teeth 142 of the comb is dimensioned in such a way as to be able to contain an article 23, see FIG. 12. The horizontal stroke which the cam mechanism 150 and lever 156 cause the rod 148 to perform is equal to the pitch of the teeth 142 of the comb.

The action of the cams 150 and 144 is combined in such a way that the comb 142 alternates the phases of rest in the lowermost position, as shown in FIG. 13, with phases of movement according to the trajectory as shown by a dotted line 157'. During this movement the comb by starting from the position of FIG. 13, at first shifts to the left by a pitch, moving with the end of the combs 142 under the upper edge of support 141, then it ascends in the slots of said support, inserting the teeth of the combs between the articles 23 immovable on the support thereupon it moves to the right, causing to advance by a pitch all of the articles existing on the support 141, when it descends again into the position of FIG. 13. Thus, said articles 23 advance intermittently on the support 141, whereupon they will dwell in succession in the station I, II$_1$, . . . II.n, III.

Opposite the station I there is located a system of arrival for the articles from the delivery machine, A, which system is identical to those disclosed hereinbefore. At station III there are likewise provided a pushing member 76 and in front thereof an admission channel for the articles to the reception machine B.

Above the stations II$_1$ . . . II.n there are provided channels 40 which are identical to those already disclosed in the first form of embodiment and also below said stations there is located an elevator 61 which with the teeth 62 enters corresponding holes 63 of the stationary support 141. At the station II.n there is arranged a sensitive lever 74 operating a switch 75, all of the aforesaid devices are completed with the same fittings as already disclosed in connection with the previous forms of embodiment and operate in the same manner and they are correlated with the same phases of movement; the motion to the right with respect to comb 142 takes place when the elevator and the pushing member are immovable.

Amongst the modifications of embodiment taken into consideration there is contemplated also the possibility of arranging side by side two conveyors of the chain or comb operated rectilinear type, which are moved with identical phases, as well as served each by an independent feed belt 21 and with sensitive levers 74 of their own, whose end stations III are arranged side by side and are swept by only one pushing member 76 performing a double stroke and which pushes the articles 23 into a sole opposite feeding channel 77 of a reception machine. In this way there may be paired the articles supplied by delivery machines and they may be conveyed to a unique reception machine.

Having thus disclosed this invention, it will be obvious for the experts of the art that different variations and modifications may be introduced without thereby departing from the spirit and from the scope of the invention and it is to be understood that the annexed claims are intended to cover also those modifications and variations which come within the spirit of the invention as disclosed hereinbefore.

In particular, there is provided:

that the switch 39, instead of being operated mechanically, is operated electrically, that it is formed for instance from an electric relay energized in parallel with the electromagnet 37, etc.;

that the introduction of the articles into the space of chain 29 in station I is effected in any way; for instance, they are introduced in the direction of arrow 22 by means of driving thrust rollers or by any other means or else by causing them to drop from above;

that the respective control of the electromagnet 37 is effected with any other electrical, pneumatic, hydraulic or mechanical means, etc., producing the same results;

that the device for the control of feed with a stop 34 and a delayed sensitive lever 25 may also be omitted;

that the articles may be caused to leave the conveyor even in the direction of advancement of the conveyor itself, by causing them to drop down, to slide down etc., with or without guides, accompanying means etc.

that the coupling and controlling means for the articles in the stores may also be of any type;

that the controlling device for the elevator may be of any type;

that the electric circuit may be varied in any way or replaced by systems of another type capable of obtaining the same effects;

that the diagram of the phases, which is only indicative of the succession and of the co-ordination of the working of the parts in a preferred form, and the distribution of the period of time between movement and dwell of the chain, the beginning and the end of the movement of the parts, etc., may be varied in any way, merely complying with the condition of having no interference between the moving parts and of having the succession of the operations necessary for the working of the mechanism. Moreover, there are made such provisions that, owing to the possibility of differentiating the velocities the delivery, the transport and the receiving capacities of the machines, at a certain moment, when the storage mechanism is filled up, there may be accelerated the movement of the transfer device and of the reception machine, so as to empty the storage mechanism. Lastly, there are made such provisions that the storage mechanisms themselves eventually may be supplied with articles even from outside for instance in a normal manner, without thereby departing from the field of protection of the patent.

What I claim is:

1. Transfer mechanism for articles traveling from a delivery machine to a reception machine and having a high capacity for automatic storage of articles comprising the combination of conveyor means for the articles, said conveyor means having a plurality of equally spaced article receiving and positioning means, first and last stations at opposite ends of said conveyor means, equally spaced transfer stations along said conveyor means between said first and last stations, means for intermittently driving said conveyor means to advance said articles to successive transfer stations, means for laterally individually feeding said articles into said article receiving and positioning means on said conveyor at said first station, a pusher member at said last station, driving means to reciprocate said pusher member transversely along said conveyor to push articles out of said article receiving and positioning means towards said reception machine, vertical storage magazines above each of said transfer stations to contain articles charged therein, each said storage magazine being provided at its lower end with opposed retaining teeth, means for releasably closing said retaining teeth beneath an article pushed from below beyond said retaining teeth for sustaining said articles within said storage magazine, releasable lateral pressure means positioned above said retaining teeth for laterally pressing upon opposite sides of an article situated immediately above the lowermost article supported by said retaining teeth, an elevator positioned at each transfer station and aligned with each storage magazine, power means for reciprocating each said elevator with a vertical reciprocating motion to move articles from said conveyor means into said storage magazines, sensing means for detecting articles in said feeding means and on said conveyor means and control means responsive to said sensing means for synchronously controlling movement of said conveyor means, feeding means, pusher member, elevators, retaining teeth and pressure means to maintain the flow of articles from said delivery machine to said reciprocating machine substantially constant.

2. Mechanism according to claim 1 wherein said conveyor means is a continuous chain having stationary guide members on opposite sides thereof and said article receiving and positioning means consists of equally spaced projections secured to said continuous chain.

3. Mechanism according to claim 1 wherein said conveyor means comprises a stationary support having longitudinal slots therein, a plurality of equally spaced combs, means for cyclically moving said combs whereby said combs project through said longitudinal slots in said stationary support during the movement of said combs in one direction thereby advancing articles from one station to the next subsequent station.

4. Mechanism according to claim 1 wherein said conveyor means comprises a rotatable table having equally spaced notches in its periphery each for receiving an article, means below said notches for supporting said articles within said notches, means for intermittently rotating said table to move said articles in succession from one station to the next and said support means being provided with holes for the passage of said elevator.

5. Mechanism according to claim 1 wherein the top of at least one of said storage magazines is provided with a sensing element capable of detecting the top article when said magazine is full and control means associated with said sensing element for starting and stopping said delivery machine.

6. Mechanism according to claim 1 wherein said means for releasably closing said retaining teeth beneath an article consists of arms upon one end of which said retaining teeth are mounted, said arms being mounted upon rotatable shafts, spring means for urging said arms and retaining teeth towards each other for retaining an article, and solenoid means associated with said rotatable shafts, means for energizing said solenoids for rotating said shafts and said arms against said spring means whereby said retaining teeth may be drawn away from each other to release said articles.

7. Mechanism according to claim 1 wherein the distance between said retaining teeth and the conveyor is at least equivalent to the distance between the top and bottom of two superimposed articles.

8. Mechanism according to claim 1 wherein said releasable lateral pressure means positioned above retaining teeth comprises pressing members for pressing upon opposite sides of an article, rotatably mounted arms upon one end of which said pressing members are mounted, spring means for urging said arms and pressing members towards each other for retaining an article, and solenoid means associated with said rotatably mounted arms, means for energizing said solenoid, means whereby said arms may be rotated away from each other and against said spring means whereby said pressing members may be drawn away from each other to release said article.

9. Mechanism according to claim 6 wherein said means for energizing said solenoids controlling said retaining teeth consists of a cyclically controlled time switch said switch being operated synchronously with the movement of said conveyor means.

10. Mechanism according to claim 1 in which said elevator is vertically moved by cam and lever means, the rotation of said cam being synchronized with the movement of said conveyor means, and the lift of said elevator is controlled by a lock operated by solenoid means.

References Cited
UNITED STATES PATENTS

| | | | |
|---|---|---|---|
| 1,609,802 | 12/1926 | Ekstrom | 198—24 |
| 1,920,762 | 8/1933 | Neff | 214—6.2 |
| 3,044,599 | 7/1962 | Gajda | 198—25 |
| 3,053,402 | 9/1962 | Russell | 214—6.2 |
| 3,122,229 | 2/1964 | Engleson | 214—6.2 |

EVON C. BLUNK, *Primary Examiner.*

SAMUEL F. COLEMAN, *Examiner.*

RICHARD E. AEGERTER, *Assistant Examiner.*